(12) United States Patent
Walsh et al.

(10) Patent No.: US 9,996,480 B2
(45) Date of Patent: Jun. 12, 2018

(54) RESILIENT DEVICE AUTHENTICATION SYSTEM WITH METADATA BINDING

(71) Applicant: Analog Devices, Inc., Norwood, MA (US)

(72) Inventors: John J. Walsh, Tampa, FL (US); John Ross Wallrabenstein, West Lafayette, IN (US); Hal A. Aldridge, Tampa, FL (US); Michael J. Duren, Oldsmar, FL (US)

(73) Assignee: Analog Devices, Inc., Norwood, MA (US)

( * ) Notice: Subject to any disclaimer, the term of this patent is extended or adjusted under 35 U.S.C. 154(b) by 146 days.

(21) Appl. No.: 15/018,451

(22) Filed: Feb. 8, 2016

(65) Prior Publication Data

US 2016/0170907 A1 Jun. 16, 2016

Related U.S. Application Data

(63) Continuation-in-part of application No. PCT/US2015/045467, filed on Aug. 17, 2015, and a
(Continued)

(51) Int. Cl.
*G06F 12/14* (2006.01)
*G06F 21/44* (2013.01)
(Continued)

(52) U.S. Cl.
CPC .......... *G06F 12/1408* (2013.01); *G06F 21/44* (2013.01); *H04L 9/0866* (2013.01);
(Continued)

(58) Field of Classification Search
CPC . H04L 9/0866; H04L 63/0876; H04L 9/3242; H04L 63/08; H04L 9/3278; G06F 12/1408; G06F 21/44; G06F 2212/1052
(Continued)

(56) References Cited

U.S. PATENT DOCUMENTS 7,564,345 B2 7/2009 Devedas et al.
7,581,248 B2 8/2009 Atkins et al.
(Continued)

OTHER PUBLICATIONS

International Search Report and Written Opinion dated Nov. 24, 2015 for Application No. PCT/US2015/045467.
(Continued)

*Primary Examiner* — Brandon S Hoffman
*Assistant Examiner* — Nega Woldemariam
(74) *Attorney, Agent, or Firm* — Wolf, Greenfield & Sacks, P.C.

(57) ABSTRACT

A resilient device authentication system for use with one or more managed devices each including a physical unclonable function (PUF), comprises: one or more verification authorities (VA) each including a processor and a memory loaded with a complete verification set (CVS) that includes hardware part-specific data associated with the managed devices' PUFs and metadata, the processor configured to create a limited verification set (LVS) through one-way algorithmic transformation of hardware part-specific data together with metadata from the loaded CVS so as to create a LVS representing both metadata and hardware part-specific data adequate to redundantly verify all of the hardware parts associated with the LVS; and one or more provisioning entities (PE) each connectable to a VA and including a processor and a memory loaded with a LVS, and configured to select a subset of the LVS so as to create an application limited verification set (ALVS). The system may also comprise one or more device management systems each connectable to a PE and to managed devices and including a memory configured to store an ALVS. The VA may also be configured to create a replacement LVS.

20 Claims, 11 Drawing Sheets

Related U.S. Application Data continuation-in-part of application No. 13/829,826, filed on Mar. 14, 2013, now Pat. No. 9,258,129, which is a continuation-in-part of application No. 13/552,592, filed on Jul. 18, 2012, now abandoned.

(60) Provisional application No. 62/037,648, filed on Aug. 15, 2014.

(51) Int. Cl.
  *H04L 9/32* (2006.01)
  *H04L 29/06* (2006.01)
  *H04L 9/08* (2006.01)

(52) U.S. Cl.
  CPC .......... *H04L 9/3242* (2013.01); *H04L 9/3278* (2013.01); *H04L 63/08* (2013.01); *H04L 63/0876* (2013.01); *G06F 2212/1052* (2013.01)

(58) Field of Classification Search
  USPC .......................................................... 713/193
  See application file for complete search history.

(56) References Cited

U.S. PATENT DOCUMENTS

| | | | |
|---|---|---|---|
| 7,681,103 B2 | 3/2010 | Devadas et al. | |
| 7,702,927 B2 | 4/2010 | Devedas et al. | |
| 7,818,370 B2 | 10/2010 | Piper et al. | |
| 7,839,278 B2 | 11/2010 | Devedas et al. | |
| 7,926,089 B2 | 4/2011 | Tulshibagwale et al. | |
| 7,962,516 B2 | 6/2011 | Bahrs et al. | |
| 7,975,306 B2 | 7/2011 | Chess et al. | |
| 8,032,760 B2 | 10/2011 | Tuyls et al. | |
| 8,171,525 B1 | 5/2012 | Pelly et al. | |
| 8,379,856 B2 | 2/2013 | Potkonjak | |
| 8,458,489 B2 | 6/2013 | Beckmann et al. | |
| 8,463,813 B2 | 6/2013 | Siress et al. | |
| 8,468,186 B2 | 6/2013 | Yu | |
| 8,516,269 B1 | 8/2013 | Hamlet et al. | |
| 8,667,265 B1 | 3/2014 | Hamlet et al. | |
| 8,752,155 B2 | 6/2014 | Lauper | |
| 8,844,009 B2 | 9/2014 | Walsh et al. | |
| 9,154,310 B1 | 10/2015 | Walsh et al. | |
| 9,258,129 B2 | 2/2016 | Walsh et al. | |
| 2003/0204743 A1 | 10/2003 | Devadas et al. | |
| 2005/0149496 A1 | 7/2005 | Mukherjee et al. | |
| 2005/0222896 A1 | 10/2005 | Rhyne et al. | |
| 2005/0278541 A1 | 12/2005 | See et al. | |
| 2008/0256549 A1 | 10/2008 | Liu et al. | |
| 2008/0256600 A1 | 10/2008 | Schrijen et al. | |
| 2008/0263363 A1* | 10/2008 | Jueneman | G06F 21/32 713/184 |
| 2009/0083833 A1* | 3/2009 | Ziola | G06F 21/31 726/2 |
| 2010/0122093 A1 | 5/2010 | Tuyls et al. | |
| 2010/0127822 A1 | 5/2010 | Devedas | |
| 2010/0250936 A1 | 9/2010 | Kusakawa et al. | |
| 2010/0272255 A1 | 10/2010 | Devedas et al. | |
| 2011/0002461 A1 | 1/2011 | Erhart et al. | |
| 2011/0033041 A1 | 2/2011 | Yu et al. | |
| 2011/0066670 A1 | 3/2011 | Yu | |
| 2011/0215829 A1 | 9/2011 | Guajardo Merchan et al. | |
| 2011/0299678 A1 | 12/2011 | Deas et al. | |
| 2012/0011577 A1 | 1/2012 | Mashimo | |
| 2012/0072737 A1 | 3/2012 | Schrijen et al. | |
| 2012/0131340 A1 | 5/2012 | Teuwen et al. | |
| 2012/0137137 A1 | 5/2012 | Brickell et al. | |
| 2012/0183135 A1 | 7/2012 | Paral et al. | |
| 2012/0324218 A1 | 12/2012 | Duren et al. | |
| 2013/0019324 A1 | 1/2013 | Tehranipoor et al. | |
| 2013/0046990 A1 | 2/2013 | Fahrny et al. | |
| 2013/0174273 A1 | 7/2013 | Grab et al. | |
| 2014/0089685 A1 | 3/2014 | Suzuki | |
| 2014/0108786 A1 | 4/2014 | Kreft | |
| 2014/0201821 A1 | 7/2014 | Walsh et al. | |
| 2014/0205090 A1 | 7/2014 | Li et al. | |
| 2015/0023495 A1 | 1/2015 | Zhang et al. | |

OTHER PUBLICATIONS

International Preliminary Report on Patentability dated Mar. 2, 2017 for Application No. PCT/US2015/045467.
[No Author Listed], nShield Security Policy: nShield F2 6000e, nShield F2 1500e, nShield F2 500e and nShield F2 10e. Thales. Version 3.2. Jun. 25, 2013. 55 pages.
Areno et al., Securing Trusted Execution Environments with PUF Generated Secret Keys. 2012 IEEE 11th International Conference on Trust, Security and Privacy in Computing and Communications. 2012;1188-93.
Bolotnyy et al., Physically Unclonable Function—Based Security and Privacy in RFID Systems. Proceedings of the 5th Annual IEEE International Conference on Pervasive Computing and Communications (PerCom'07). 2007. 8 pages.
Cortese et al., Efficient and Practical Authentication of PUF-based RFID Tags in Supply Chains. Program for the IEEE International Conference on RFID-Technology and Applications. Guangzhou, China. Jun. 17-19, 2010;182-8.
Frikken et al., Robust Authentication Using Physically Unclonable Functions. 12th International Conference, ISC 2009. Pisa, Italy. Sep. 7-9, 2009. Information Security Notes in Computer Science. 2009;5735:262-77.
Hammouri et al., PUF-HB: A Tamper-Resilient HB based Authentication Protocol. ACNS 2008. LNCS 5037. 2008;346-65.
Hausheer et al., Resilient Networks and Services. Second International Conference on Autonomous Infrastructure, Management and Security (AIMS). Bremen, Germany. Jul. 1-3, 2008;5127. Abstract only.
Kirkpatrick et al., PUF ROKs: A Hardware Approach to Read-Once Keys. Proceedings of the 6th ACM Symposium on Information, Computer and Communications Security (ASIACCS 2011). Hong Kong, China. Mar. 22-24, 2011;155-64.
Kirkpatrick et al., PUF ROKs: Generating Read-Once Keys with Physically Unclonable Functions (Extended Abstract). 6th Annual Cyber Security and Information Intelligence Research Workshop. Oak Ridge, TN. Apr. 21-23, 2010. 4 pages.
Paral et al., Reliable and Efficient PUF-Based Key Generation Using Pattern Matching. 2011 IEEE International Symposium on Hardware-Oriented Security and Trust (HOST). 2011;128-33.
Suh et al., AEGIS: a single-chip secure processor. IEEE Design Test Comp. 2007:570-80.
Yu et al., Recombination of Physical Unclonable Functions. 35th Annual GOMACTech Conference, Reno, NV. Mar. 22-25, 2010. 5 pages.
Yu et al., Secure and Robust Error Correction for Physical Unclonable Functions. IEEE Design Comp. Jan./Feb. 2010;48-64.
Zeng et al., Non-Cryptographic Authentication and Identification in Wireless Networks. J IEEE Comm. Oct. 2010;17(5):56-62. 8 pages.
Dwoskin et al., "Hardware-rooted Trust for Secure Key Management and Transient Trust", ACM Conference on Computer and Communications Security (CCS) 2007, Alexandria, VA, p. 389-400.
Tuyls et al., "Capacity and Examples of Template Protecting Biometric Authentication Systems," Biometric Authentication, vol. 3087 Lecture Notes in Computer Science, p. 158-170.
Rust (editor), "Report on use case and architecture requirements," Holistic Approaches for Integrity of ICT-Systems (HINT) (2013).

\* cited by examiner

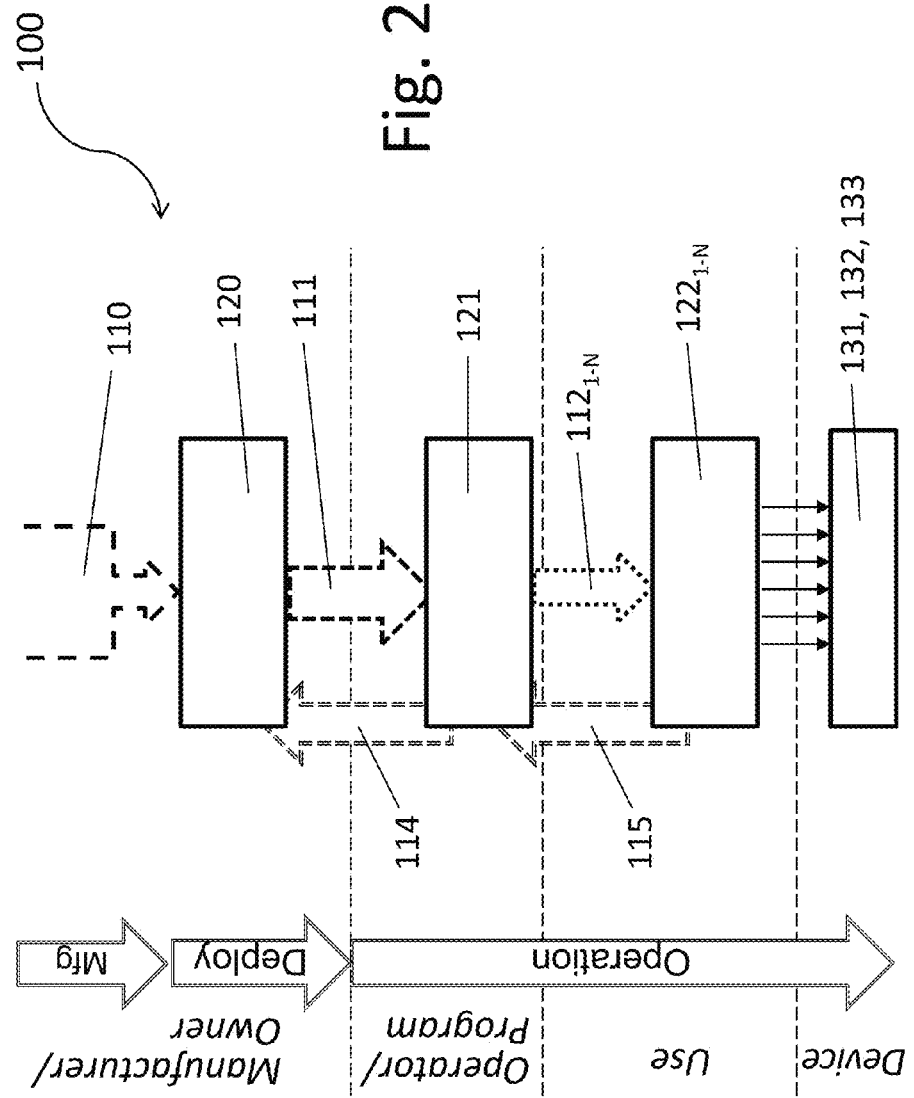

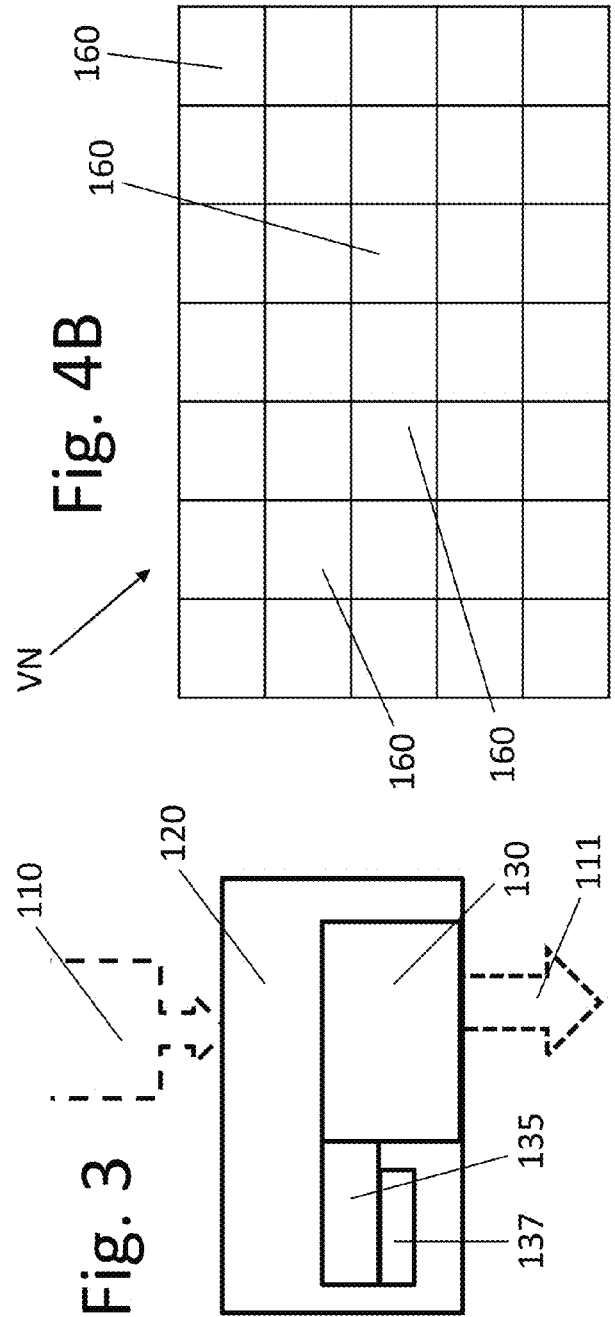
Fig. 4A
Fig. 4B
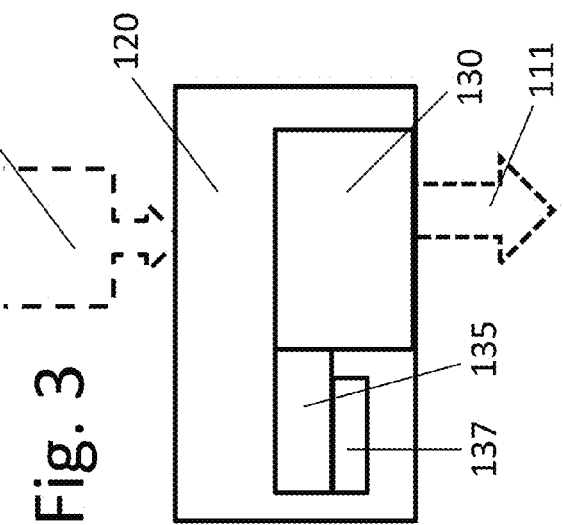
Fig. 3

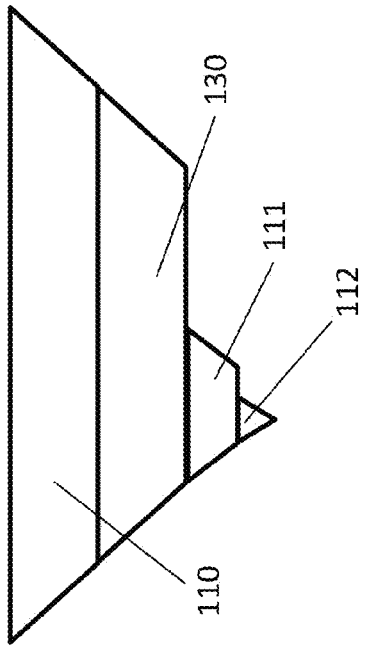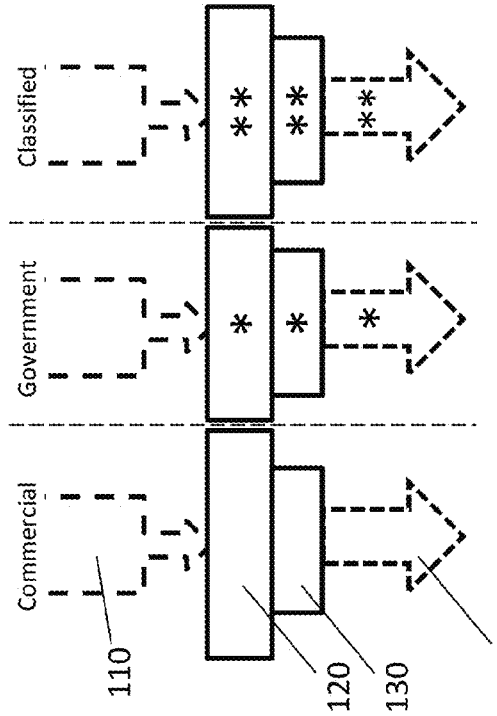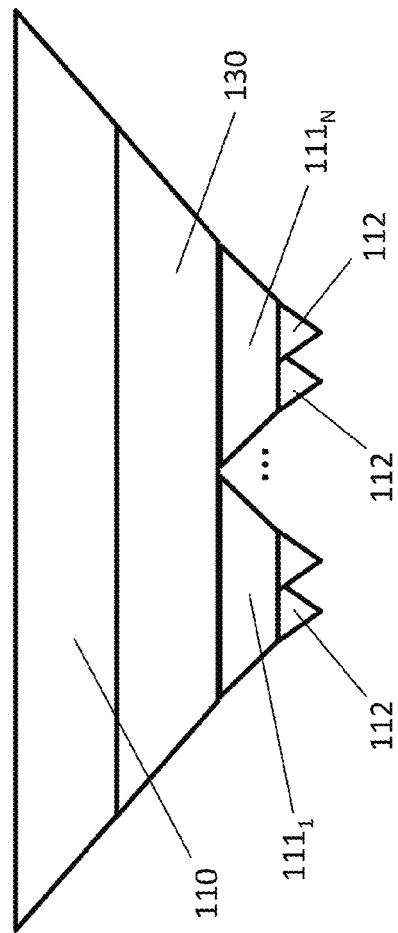

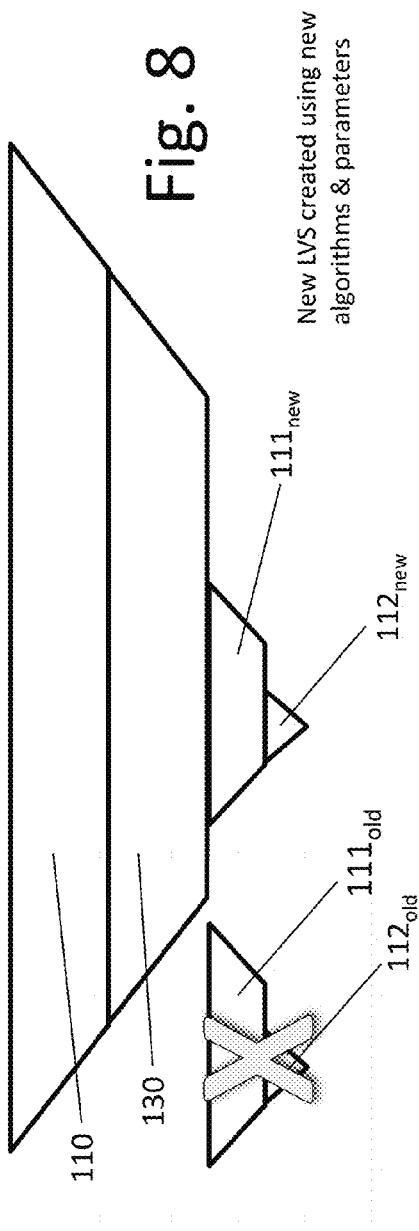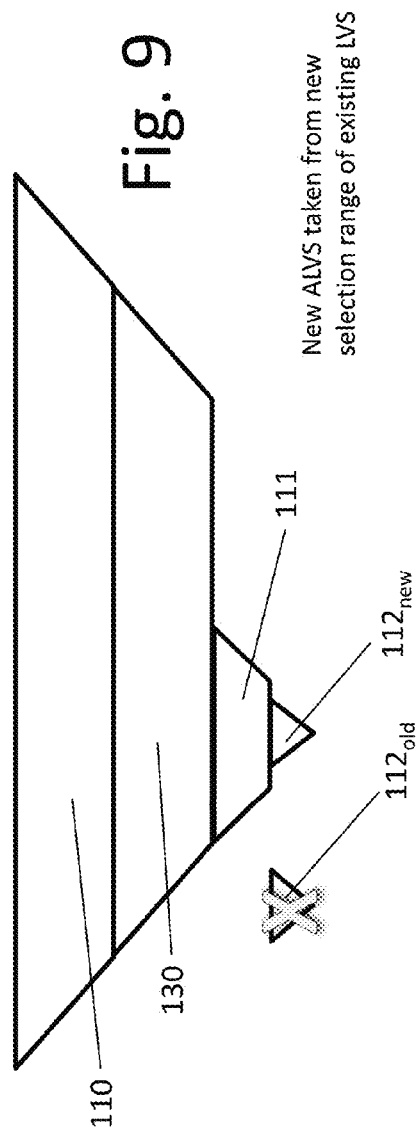

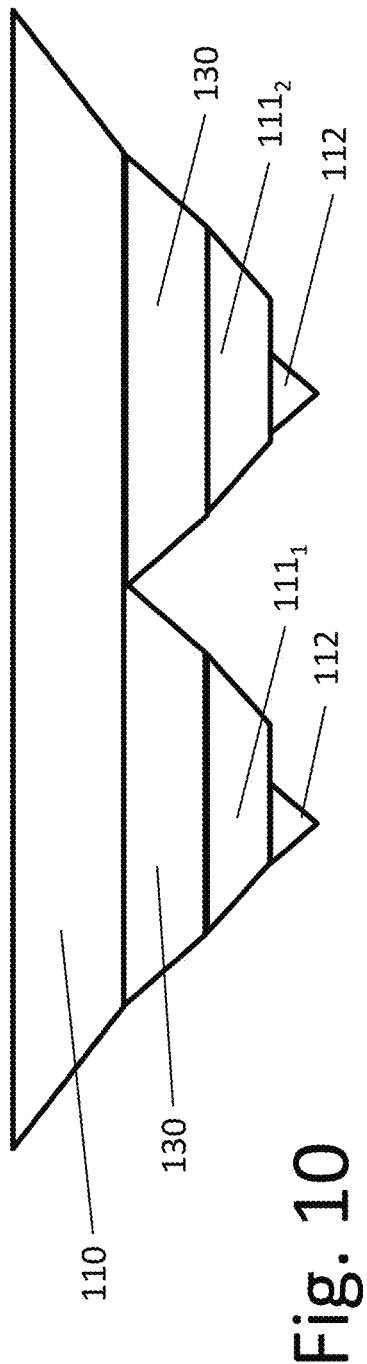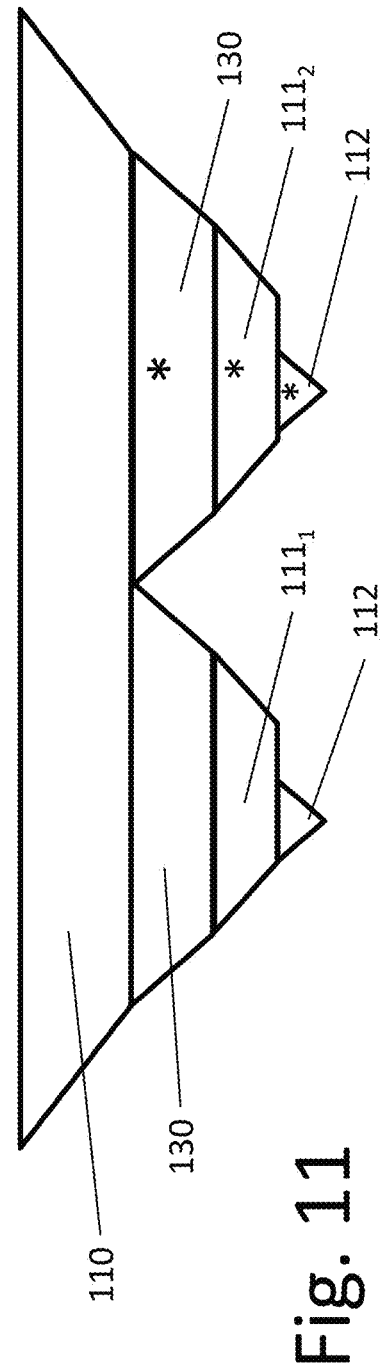

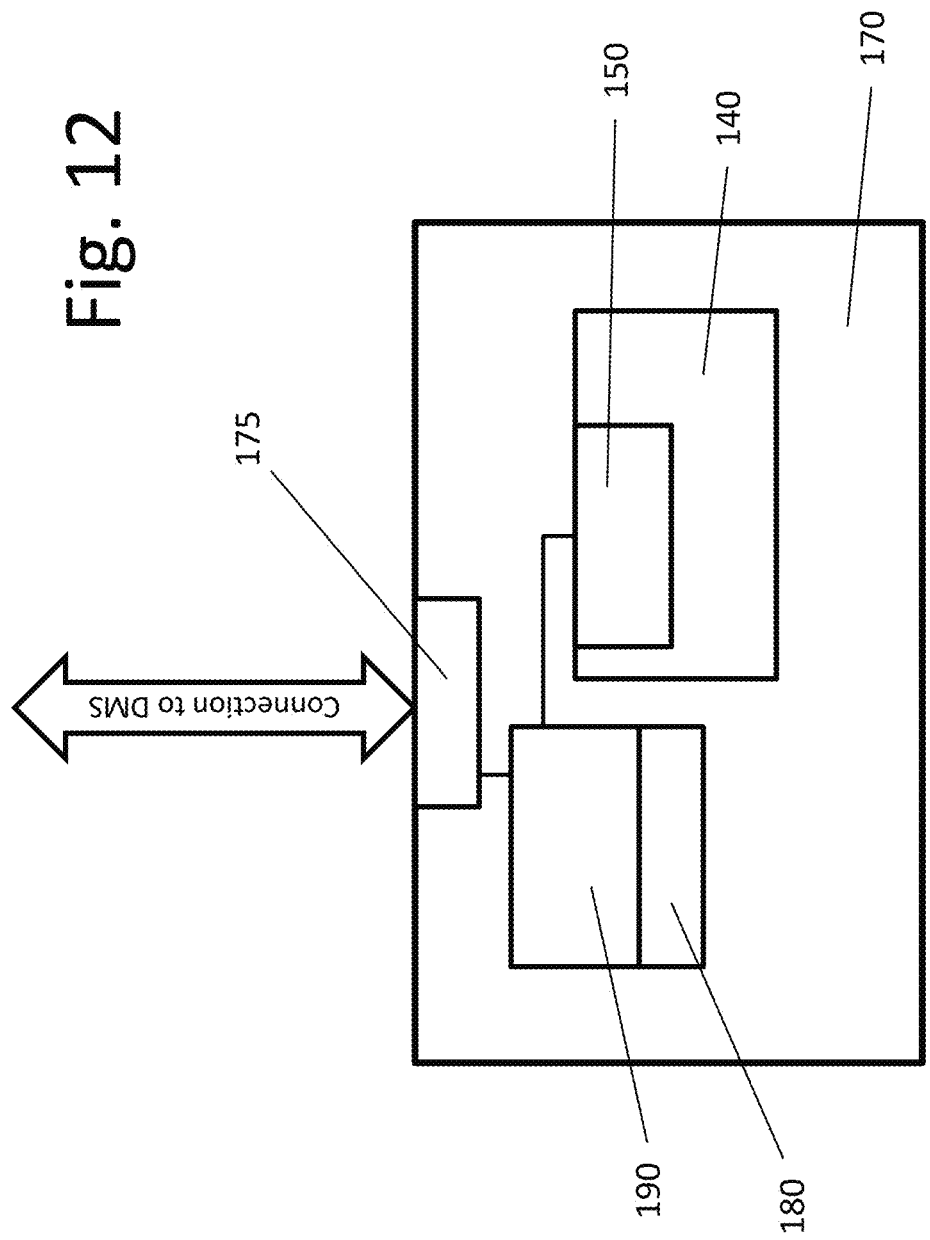

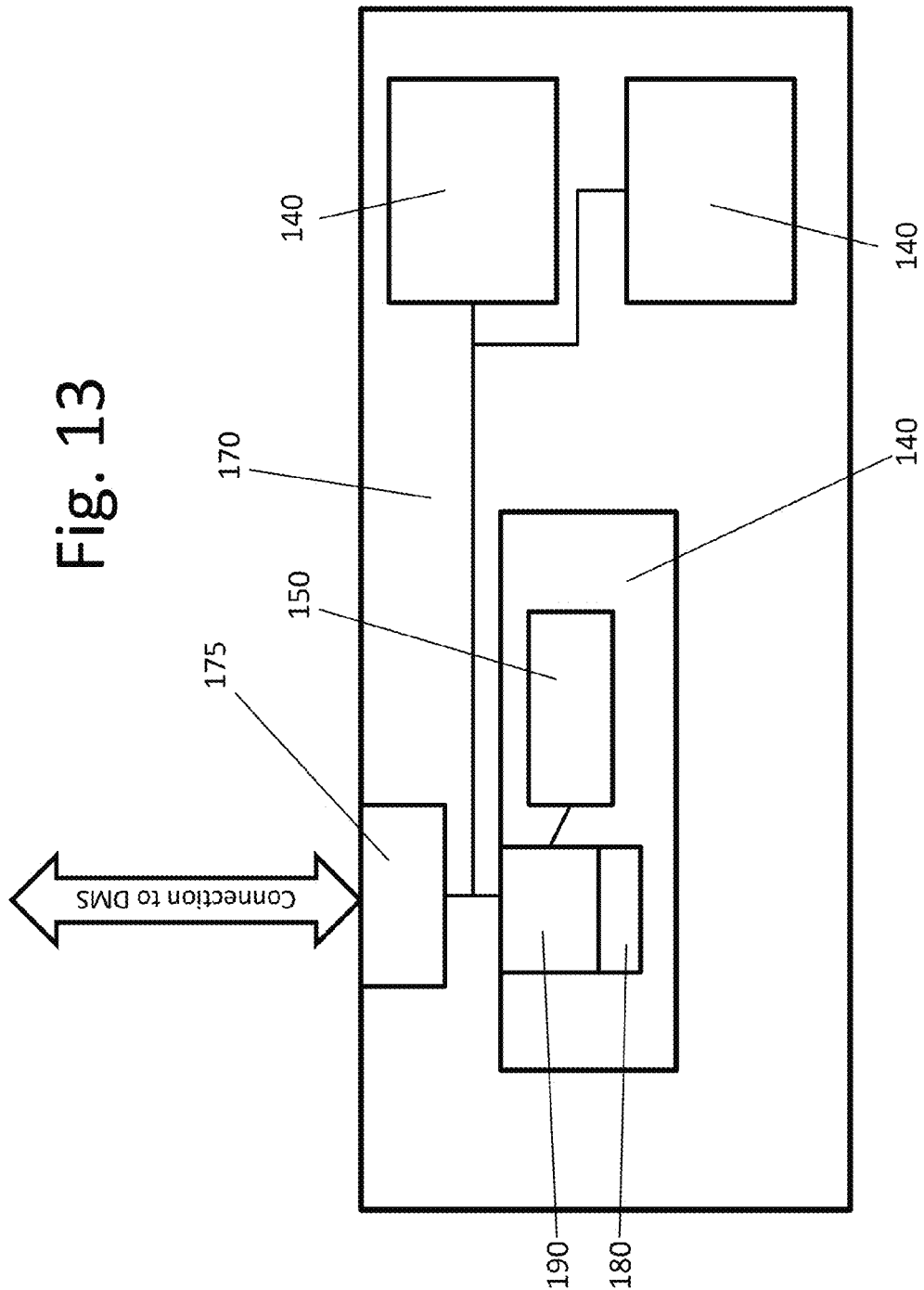

RESILIENT DEVICE AUTHENTICATION SYSTEM WITH METADATA BINDING

CROSS-REFERENCE TO RELATED APPLICATIONS

This application is a continuation-in-part of U.S. patent application Ser. No. 13/829,826 filed Mar. 14, 2013, which was in turn a continuation-in-part of U.S. patent application Ser. No. 13/552,592 filed Jul. 18, 2012, and is a continuation-in-part of PCT application S.N. PCT/US15/45467 filed Aug. 17, 2015 and claims the benefit of U.S. provisional patent application Ser. No. 62/037,648 filed Aug. 15, 2014.

BACKGROUND

Managing authentication and identity across systems, users, and enterprises is complex and threat-prone, and increasingly so as endpoints and cloud-based systems continue proliferating. Current solutions for identity management, authentication, and key management are typically disparate in nature and confined in design and purpose to specific applications (e.g., network authentication protocols, PKIs, code-signing, biometrics, etc.). Various methods for deploying identity authentication technologies in contexts such as "smart grids," cloud computing, and enterprise networks and network extensions typically include a variety of applications that would require a number of dissimilar prior art technology solutions, so as to complicate and multiply overall design, planning, and cryptographic-related overhead.

The manufacturing and provisioning costs and burdens associated with establishing "hardware biometrics" (i.e., observable intrinsic features of hardware device material, design, or manufacturing process that can uniquely differentiate a specific device from other devices of the same or similar type) to enable secure device identification, registration, and management are not insignificant. Prior to Applicant's inventions, the presumably attendant limitations and ongoing added operating complexity, risk, and overhead would have discouraged attempts to employ hardware biometrics in any types of architectures known to Applicant for managing and authenticating identities across systems, users, and enterprises, as would be required for a manufacturing through end-use approach.

SUMMARY OF THE INVENTION

Applicant has devised a novel system architecture employing hardware biometrics that can avoid the aforementioned ongoing disadvantages, and can outweigh the upfront costs and burdens by virtue of system operating efficiency and reduced costs of trust management and compromise. The present Resilient Device Authentication ("RDA") system enables a holistic development and management of systemic trust mechanisms grounded in physical hardware and extending into the manufacturing process, operating systems, applications, and whole systems, and can be deployed efficiently in a system having a range of diverse applications, throughout the system's lifecycle. Thus hardware-anchored security-related functions that could be performed by applications in various embodiments of an RDA system may include, among many other things, authentication, supply chain security functions, encryption, policy management, data or document certification, key management, etc.

A resilient device authentication system for use with one or more managed devices each including a physical unclonable function (PUF) wherein the system further utilizes metadata in authentication, as claimed in the present application, comprises: one or more verification authorities (VA) each including a processor and a memory loaded with a complete verification set (CVS) that includes hardware part-specific data associated with the managed devices' PUFs and metadata, the processor configured to create a limited verification set (LVS) through one-way algorithmic transformation of hardware part-specific data together with metadata from the loaded CVS so as to create a LVS representing both metadata and hardware part-specific data adequate to redundantly verify all of the hardware parts associated with the LVS; and one or more provisioning entities (PE) each connectable to a VA and including a processor and a memory loaded with a LVS, and configured to select a subset of the LVS so as to create an application limited verification set (ALVS). The system may also comprise one or more device management systems each connectable to a PE and to managed devices and including a memory configured to store an ALVS. The VA may also be configured to create a replacement LVS

BRIEF DESCRIPTION OF THE DRAWINGS

FIG. 2 depicts an embodiment of a system like that shown in FIG. 1, except that each entity in the lowest level (Distributed Management Systems) universally handles functions that are split between the corresponding entities in the embodiment of FIG. 1, also showing the system's basic divisions according to function or loci.

FIG. 3 depicts part of the system of an embodiment like those of FIGS. 1 and 2, showing further details of the Verification Authority.

FIG. 4A is a representation of a set of 1-N parts (P) having corresponding verification information (V) of different types.

FIG. 4B is a representation of a set of data elements comprising verification information collected for Part N.

FIG. 5 is a diagram like that of FIG. 3, but with a siloing of Verification Authorities and data by class.

FIG. 6 depicts the top-down data provisioning model of an embodiment of an RDA system.

FIG. 7 depicts a specific example of a provisioning in the embodiment of FIG. 6.

FIG. 8 depicts the change or updating of a Limited Verification Set in an embodiment of an RDA system.

FIG. 9 depicts the change or updating of an Application Limited Verification Set in an embodiment of an RDA system.

FIG. 10 depicts a segmentation of Complete Verification Set data in an embodiment of an RDA system.

FIG. 11 depicts a segmentation of data and algorithms in an embodiment of an RDA system.

FIG. 12 is a partial circuit diagram of a device that can be used in an embodiment of an RDA system that manages devices with hardware parts having PUFs.

FIG. 13 is a partial circuit diagram of another version of a device like that of FIG. 12.

DETAILED DESCRIPTION OF EMBODIMENTS

The following acronyms are used for basic aspects of the present system:
"CVS" refers to the Complete Verification Set, which is a super-set of hardware-based part-authentication data.
"LVS" refers to a Limited Verification Set, which is a set of data that is derived from part of the CVS.
"ALVS" refers to an Application Limited Verification Set, which is a subset of elements chosen from part of an LVS.
"VA" refers to a Verification Authority, which stores the CVS and creates and distributes LVSs therefrom.
"PE" refers to a Provisioning Entity, which stores an LVS and constructs and distributes ALVSs therefrom.
"DMS" refers to a Device Management System, which stores an ALVS and uses it to authenticate devices (i.e., specific hardware parts) in the system.

Figure 1:
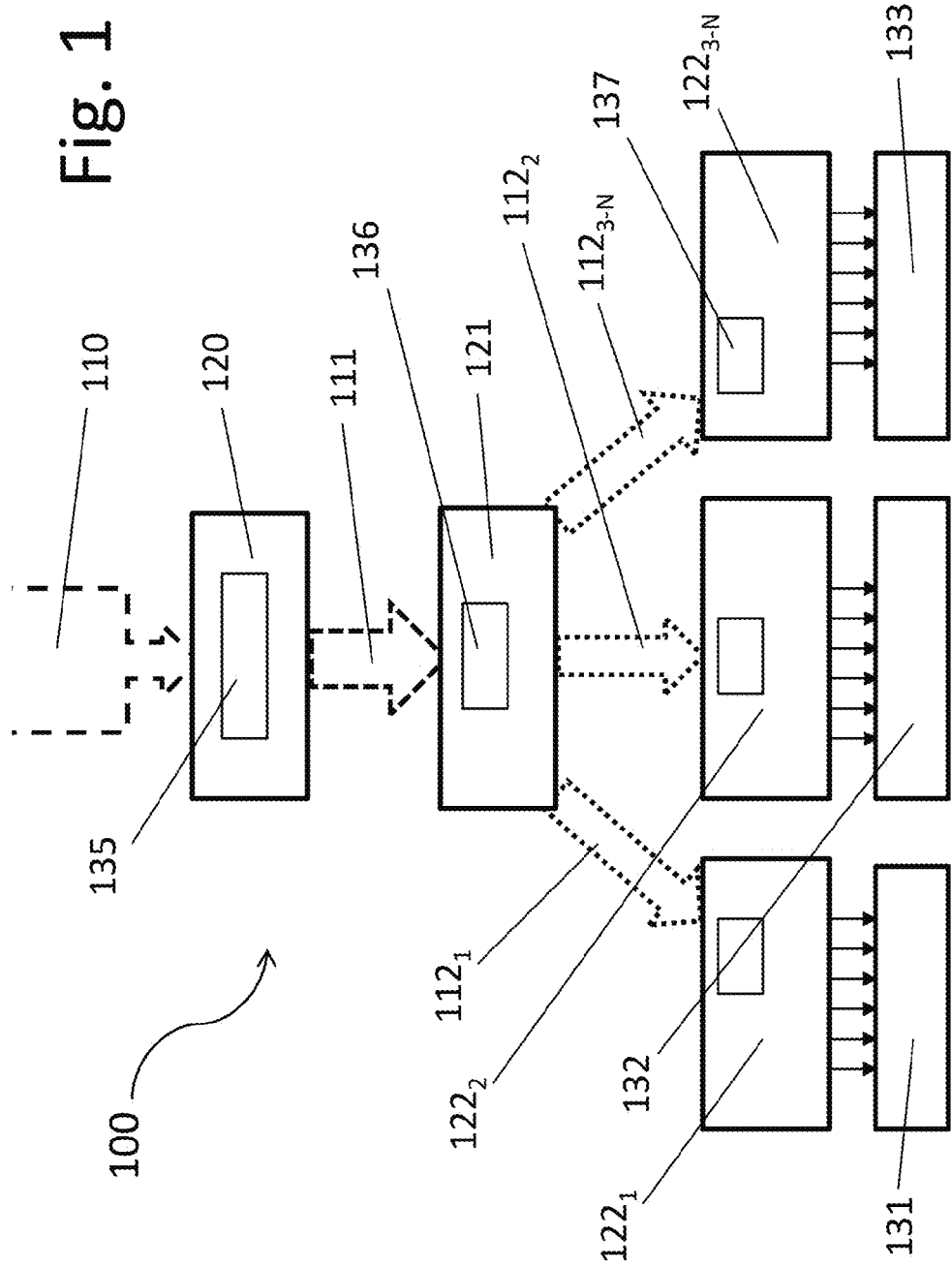
FIG. 1 depicts an embodiment of an RDA system according to the present invention, showing its hierarchical control, flow, and use of device verification information among and by three levels of entities.

Referring to FIGS. 1 and 2, an embodiment of an RDA system 100 according to the present invention can manage authentication-related functions for diverse applications such as supply chain risk management ("SCRM") 131, authentication 132, and other applications 133 (e.g., device management, access management, connectivity management, etc.), using the foundation of a CVS 110 for all hardware verification and authentication functions. The CVS is provided to a VA 120, which distributes an LVS 111 based on the CVS to a PE 121 (or, not shown, the system preferably includes multiple PEs to each of which the VA distributes a different LVS), which in turn provides ALVSs 112$_{1-N}$ to DMSs 122$_{1-N}$, which then directly interface with the applications.

The CVS is an essentially static database comprising part-specific data elements 160 for all hardware parts 140 (see FIG. 4B) in the system. Preferably each of the elements of the CVS is bound to the unique identity of one specific part, and preferably each part has a plurality of elements bound to it. The database preferably includes significantly disparate types of elements and multiple elements of usefully-unrelated information for each part, so as to permit strong, feature-rich authentication. Such data elements can include (but are not limited to) various parameters, information, validation material, processes, and secrets, etc. such as challenge/response pairs, physical elements that can be remotely interrogated, shared secret information embedded during manufacture, and physical properties that can be used to model a device. CVS elements may be used directly for authentication, may be used as characteristic values for deriving authentication methods tied to a device, and may be sub-divided and allocated such as for a particular use or verification process. Specific elements may contribute different features to the authentication process, for example one being used to identify the physical device while another is a revocable component (e.g., relational information such as a device's registered location). We refer to such relational or auxiliary information as metadata (e.g. GPS location, Sensor Output, etc.). Confidentiality, integrity, assurance, and performance can be managed through the selection of revocable and non-revocable elements to be included in the CVS.

The CVS includes device-level—and preferably chip-level—security data elements based on one or more types of hardware features such as physical unclonable functions ("PUFs") 150, PUF-derived data, physical features of a design, etc. Such data elements can be formed, derived, revealed, and recorded, and/or tested for presence, robustness, and applicability at the time of manufacture. For example, in the case of a PUF, the loading and characterization of device may occur upon fabrication of an application specific integrated circuit ("ASIC") or initial programming of a field-programmable gate array ("FPGA"). The managed devices also may be constructed so that some or all of their data elements are capable of being extracted in an untransformed form only during the manufacturing of device and not afterwards, or other means (e.g., a controlled PUF construction) may be provided to prevent unauthorized access to untransformed data elements. The CVS may also contain additional metadata to permit strong, feature-rich authentication. Metadata is auxiliary information relating to the identity or state of an entity involved in authentication, upon which information the authentication protocol depends, and which is provided in addition to information derived from the identity of the physical device. Metadata may include GPS location, sensor outputs (e.g. accelerometer, gyroscope, etc.), biometric information (e.g., fingerprints, retina, iris, voice and vein patterns), user parameters (e.g. username, password, PIN), and other auxiliary information related to an authentication protocol. Metadata binding refers to the process of incorporating auxiliary metadata into the authentication process.

Referring to FIG. 3, once the CVS database is created and collected, it is supplied to a VA 120, which stores it in memory 135. The VA is responsible for: (1) securely storing and managing the CVS; (2) managing requests for LVSs 111; (3) processing CVS data to create LVSs; and (4) distributing LVSs. The VA owner must be able to protect and handle the CVS data at an assurance level at least commensurate with the requirements of the system's most sensitive parts and applications, and typically would be a manufacturer, high-level program entity, or service provider. If a system is intended to manage parts having different security classes (e.g., commercial, government, and classified as shown in FIG. 4A), CVS data preferably may be grouped by reliability, detection, and variability properties, and allocated through the system according to the applicable information assurance requirements and uses of different applications. In such cases, CVS data also can be siloed between multiple VAs having corresponding different levels of security and LVS algorithms 130 as shown by the unmarked, single-asterisked, and double-asterisked siloes in FIG. 5, or a single-VA system could have an architecture that is similarly internally-siloed. Thus, as depicted by the asterisks in FIG. 11, a different security level of algorithm can be used to create LVS 111$_2$ than the one used to create LVS 111$_1$ (whereas in the non-siloed system shown in FIG. 10 the same security level of algorithms is used to create both LVSs, albeit using different CVS elements). Depending on security requirements, higher-security VAs or internal siloes optionally also (not shown) could receive and process lower-security CVS data; for example, a classified-level VA could handle not just the classified parts of the CVS but also commercial and government parts.

Whether siloed or not, a federation of multiple VAs each limited to a separate subset of CVS data optionally could be employed, possibly communicating CVS-related data among each other with measures to prevent any VA owner from deriving another's CVS data subset. In a federated VA embodiment, for example one VA could store parts' CRPs while another VA stores parts' secret keys. This federated structure could support, for example, a federated identity brokering system such as that disclosed in U.S. Pat. No. 7,581,248 to Atkins et al., the disclosure of which is incorporated herein by reference. Such a combination, with the present RDA system providing the data used to implement authentication, would provide a federated identity structure useable with cloud and other distributed applications that has the added benefit of hardware-based authentication.

Referring to FIG. 2, the VA does not frequently distribute an LVS during the operation phase, but only as a result of need for initial provisioning by a PE 121, request 114 to recover a compromised or lost LVS, or policy-dictated update. The VA derives an LVS's elements from CVS elements that comprise, or more preferably are chosen from, a subset of elements applicable to the recipient PE. The VA should be configured to ensure that each LVS it creates includes representation of CVS elements adequate to: a) redundantly verify all of the parts managed by the recipient PE; and b) satisfy all of the applicable applications, accounting for the degree of usefulness that each type of element has in each application (e.g., SCRM, device management, access management, connectivity management, etc.). The VA retains a record of all LVS data it has distributed (and the CVS elements, algorithms, and parameters used in their creation) and to which PEs, enabling tracing of part-specific CVS elements down to a PE.

Referring to FIGS. 6 & 7, each LVS $111_{1-N}$ is derived from the CVS in a way that produces new (though related) data, utilizing subset CVS data as input parameters in algorithms that include cryptography (e.g., hashing such as with SHA-1 or SHA-2 families), randomness, and/or physical models. One-way algorithms are preferably chosen that preclude reverse construction of CVS elements from any or all distributed LVSs even if the algorithms and parameters that were used to create them are known. Depending on the level of assurance desired for a system, algorithmic complexity (and quality and orthogonality of CVS data) also should be sufficient to make available virtually infinite LVS algorithms (and thus derivable LVSs) or at least preclude the future repeat of any LVS elements and/or parts thereof given the applicable exposure factors such as the system's anticipated service life, the frequency of updates and recoveries, etc. (If less assurance is required and where none of the data at issue is compromised, the VA could be configured to redistribute an LVS lost by a PE). For example, virtually infinite LVS elements could be obtained from a CVS element by including a large (e.g., 128-bit) random value in the one-way transformation and selecting numerous different random values to obtain numerous corresponding different LVS elements. An example of a one-way transformation is a cryptographic hash function, which is generally defined as $H(\cap): \{0,1\}^* \rightarrow \{0,1\}^\lambda$, where $\lambda$ is a fixed constant. That is, a hash function $H(\cap)$ (or written explicitly as $Hash(\cap)$) takes an input of arbitrary size, and maps to a finite output domain. For cryptographic settings, hash functions must satisfy additional properties. In the context of binding metadata in authentication protocols, a hash function should preferably be one-way, collision-resistant, and satisfy an avalanche condition. One-way means that it is computationally infeasible to determine the input x when given the output $H(x)$, ensuring the output $H(x)$ does not reveal anything about the input x. Collision-resistant means that it is computationally infeasible to provide a different set of metadata y such that $H(x)=H(y)$, where x is the proper metadata for a given entity. The avalanche condition means that each bit of $H(x')$ is complemented from $H(x)$ with a probability of ½, where x is any hash input and x' is x with a single bit complemented, ensuring that the output $H(x)$ changes substantially in response to a minor change to the input x, which allows any change to the metadata to be detected and force a failed authentication.

The LVS is distributed to a PE—typically owned by an application owner or program operator—which securely stores its LVS in a memory 136, and when needed (e.g., upon initial DMS provisioning, DMS-requested recovery, regular update, VA-initiated reprovisioning, etc.), chooses a subset of elements from its LVS adequate to uniquely identify each part managed by a specific DMS 122 in its domain, and preferably without one-way algorithmic transformation, provides the chosen elements to that DMS in the form of an ALVS 112, which the DMS stores in memory 137. The system preferably is configured to preclude (or at least intelligently limit) reuse of LVS elements by a PE, so each PE maintains a record of all ALVSs it has provided (and to which DMSs, enabling tracing down to them).

DMSs may be provided with mutually-exclusive (non-overlapping) ALVS data elements, or the RDA system may be configured so that ALVS data is shared or synchronized (for example the system may be configured so that one DMS would need to re-confirm an attribute that another DMS has already confirmed for its application) among multiple DMSs in a domain, in which case coordination thereof may be managed by the responsible PE. A system may be configured so that all DMSs communicate directly with their PE to obtain all new or updated ALVSs, or configured so that certain ALVS data is obtained via peer-to-peer sharing among DMSs. In the latter case, DMSs could establish trust among each other (and optionally, re-keying could be effected) using the methods taught in Applicant's co-pending application Ser. No. 13/163,086 (the disclosure of which is incorporated herein by reference), with the DMSs being the nodes and the PE being the central authority. (Such peer-to-peer sharing could also greatly enhance the scalability of a given PE's domain). Each DMS communicates directly with fielded devices, using its ALVS data to perform application-specific security-related functions for various applications such as SCRM, authentication, encryption, etc. A DMS may be confined to an exclusive or an overlapping "enclave" that is limited geographically (e.g., a cellular communications tower and the devices authorized to communicate with it), by application, by program, etc. Each DMS records a log of all of its device interactions, for operational accounting and traceability purposes.

Global, straightforward traceability to trusted hardware-specific security information is enabled through the VA's static CVS data/part bindings in conjunction with the DMSs' and the PEs' records tracking down to specific transactions with individual devices. (Such records also may be required to enable various applications' security-related functions). Since operational data (ALVS/LVS) can be protected with one-way algorithmic obfuscation (and/or encryption), however, such data cannot be tied directly to any useable CVS element without information that only the VA possesses and controls for secure use as needed.

An RDA system may be configured so that DMSs can use the results of authentication checks to authorize, promote, inhibit, or block interactions between specified machines, software modules, hardware modules, systems, and/or users. As one example, a DMS could check the parts in a supply chain each day (e.g., to confirm that they are the same as the day before), and could temporarily shut down or permanently disable part or all of a system if certain types of compromises (e.g., suspected counterfeiting) are detected.

An RDA system also may be configured in which devices communicate with each other using real or virtual routers using a communications protocol (e.g., packetized) that utilizes identification based on each device's hardware part-specific data instead of an IP address or the like. For example, devices could be networked through real routers that communicate with, are operationally configured by, and receive real-time authorized device identifications (and preferably also corresponding permitted communications for each device) from DMSs. Or one or more devices could be programmed (individually, or using distributed computing and/or data) to perform such routing functions virtually. In either case, a graphic user interface may be incorporated into DMSs (and/or at another level) to provide for network management including router configuration, policy administration, etc. The DMS preferably would be configured to disable network communication by any devices that may be affected by compromise, automatically in response to specified device interactions or other indications of compromise.

Top-Level Firewall, Tailored Middle- and Lower-Level Recovery Processes

As discussed above, different types of data sets—CVS, LVS, and ALVS—are used at each vertical level of the system. Whereas the VA is on-demand only, the DMSs (and PEs to the extent a system has synchronized ALVS) control normal operational use of verification data for multiple applications controlled/owned by the system and thus may face greater exposure; it also may be impractical to implement all of the same security measures used by the VA at the levels below. Cementing the distinction between CVS versus LVS/ALVS with the one-way algorithms that are used to derive LVSs from CVS data, however, effectively firewalls the latter from potentially lower assurance levels underneath the VA. (The same distinction also enables security against top-down risk vectors—if the CVS itself were somehow compromised, still the VA would be able to create and distribute new LVSs that are secure in that new algorithms and parameters not known to the VA at the time of compromise would be employed).

The distinction between CVS, LVS, and ALVS likewise enables the tailoring of correspondingly distinct ALVS and LVS recovery processes so as to permit the enforcement of vigilant security policies at the level of use without incurring much (or in some cases, any) system-wide overhead. Since DMSs are at the level of use, they and the elements in their data sets are exposed to the most likely and frequent source of direct compromise in the system (namely, the variety of fielded devices with which the DMSs constantly interact). Correspondingly, the ALVS recovery process preferably is straightforward and has little or no collateral impact on PEs (and their respective DMSs) other than the PE in whose domain the recovering DMS exists, and depending on the embodiment preferably may also have little or no collateral impact on the other DMSs in the same domain. Thus, a DMS that needs a new or updated ALVS $112_{new}$ (due to loss or compromise of the existing ALVS $112_{old}$, and/or DMS-enforced policy) makes a recover request 115 to the PE (or in the case of peer-to-peer DMSs, possibly to one or more peer DMSs) including information regarding any compromise, and the PA just selects a group of previously-unused elements from its LVS and provides it to the DMS (as shown in FIG. 9 versus FIG. 7) and possibly conveys compromise-related information up to the VA. (The VA preferably processes such information and includes it as appropriate in a blacklist 137 of any compromised underlying CVS elements and/or hardware, and depending on the VA's policies and the specific compromise(s) at issue, pushes a new LVS (or LVSs) down, in response to which the affected PE(s) distribute new ALVSs). Only at the middle level (i.e., PE), where recovery should be needed less frequently, is a somewhat more burdensome recovery process used. If a PE no longer has enough useable elements to construct new ALVSs, it makes a recover request to the VA, which creates and provides the PE a new LVS $111_{new}$ to replace the old LVS $111_{old}$ (see FIG. 8), and the PE selects and pushes new ALVSs therefrom to the DMSs in its domain.

Additional Security Measures

Security compromises should not require device-level replacement, because ALVS compromises only affect specific subsets of LVS elements and in any case the CVS is effectively firewalled against LVS data compromises; further, the newly-created information employed in LVS algorithms would ameliorate even the case of direct compromise of a CVS itself. Nevertheless, it may be preferable to layer additional security measures, such as keyed and encrypted communications between all or specified entities, onto the RDA system's inherent security. In the case of communications between DMSs and devices, such additional measures could be enhanced further by sharing with a part a secret value or key that identifies the specific hardware security feature or sub-feature (e.g., the location of PUF sub-circuits) to be used in authenticating that part.

Embodiment Utilizing CRP Data

Referring to FIGS. 12 and 13, an embodiment of an RDA system can manage devices 170 with hardware parts 140 having PUFs 150. PUFs may be characterized through the cataloguing of numerous challenge response pairs ("CRPs") upon manufacture or initial programming of an FPGA. (The validation of such PUFs through the use of CRPs is described in U.S. Pat. No. 7,839,278 to Devedas et al. and U.S. Patent Application Publication Nos. 2011/0066670 to Yu, 2011/0033041 to Yu et al., 2010/0272255 to Devedas et al., and 2010/0127822 to Devedas et al., the disclosures in that regard of which are incorporated herein by reference). A challenge response pair is a set {C,R} where the response R is the output of the PUF on challenge C, such that R=PUF(C). This cataloguing produces a table of CRPs for each part, which can then be divided into a plurality of smaller tables each of which is stored (along with a binding to the unique identity of the corresponding part) as an element in the CVS database.

The VA can be configured to produce an LVS element from such a CRP-based CVS element by obfuscating the response value of each of the element's pairs one-by-one using a suitable one-way algorithm as discussed above (e.g., hashed with parameters and a key), and re-pairing the resulting obfuscated response value with each corresponding non-obfuscated challenge value. The resulting challenge/obfuscated-response pairs for the element then also could be encrypted using suitable known encryption means, either pair-by-pair (and then reassembled along with the element's binding information) or all together (but preferably before joining the binding information). Alternately the initial complete table of CRPs for a part could be stored (along with a binding to the unique identity of the corresponding part) undivided as a single element in the CVS database, and the VA create an LVS element from it by choosing a number of (preferably not all) CRPs from the element's CRP table, one-way obfuscating the response value of each of the chosen pairs one-by-one, re-pairing each resulting obfuscated response value with the corresponding non-obfuscated challenge value, and if desired encrypting pair-by-pair or element-by-element and then joining the binding information. Prior to the foregoing encryption, challenge values additionally might be individually encrypted with an encryption key that is derived (such as with a hashing algorithm) from a base key known only to the VA and the system's devices (preferably by securely embedding or otherwise providing it in them at the time of their fabrication); such a system then also could be partitioned using different base keys that are specific, e.g., to a particular PE's domain's (or even DMS's enclave's) devices.

The VA joins the LVS elements it creates for the parts in a particular PE's domain to produce an LVS, and provides it (preferably encrypted) to that PE. The recipient PE then can search the LVS's part-identity binding information (which is preferably stored in the elements unencrypted and/or external to the elements themselves, so as to avoid unnecessarily unencrypting all LVS elements), identify the subset of elements that is relevant to a particular DMS, choose some of those elements with which to construct an ALVS, and provide that to the DMS (preferably via a communication that is encrypted). The recipient DMS then (unencrypting the elements if necessary) can utilize the ALVS's relevant elements to manage various applications' security-related functions that comprise or involve interaction with one or more devices 170 (e.g., via an input/output 175 the device is provided with). While the ALVS elements contain useable PUF challenge data, however, the valid response data for the corresponding responses is obfuscated in a manner (i.e., one-way) such that it is unknowable to the DMS. Consequently, the DMS can only verify a device in the field responding to its challenge if the response matches the obfuscated one known to the DMS. This can be accomplished by including in each device 170 (or alternately as shown in FIG. 13, in every part 140) a memory 180 in which is loaded the specific algorithm and parameter information (e.g., specific hash function, and other inputs) that was used by the VA to create the elements pertaining to that device (or part, in the embodiment of FIG. 13) in the responsible PE's current LVS, and a controller 190 capable of performing the same algorithmic transformation (using the information in the memory) on responses generated by the PUF 150. In such case it may also be preferable to utilize a controlled PUF for example as taught in U.S. Patent application publication No. 2008/0059809 to Van Dijk (the disclosure of which in that regard is incorporated herein by reference), with the system configured so that only a VA is capable of extracting an untransformed PUF response from a device 170; or the devices 170 may be constructed such that untransformed responses can be extracted only during manufacture and not afterwards.

The algorithm and parameter information stored in each memory 180 preferably may be conveyed there from the VA in a special element, which, upon the issuance or updating of an LVS, the recipient PE distributes to each DMS in its domain, which in turn convey the special elements on to each device they manage. In such case, each LVS is associated with as many special elements as there are devices in the recipient PE's domain, and the special elements preferably are sent alongside the corresponding LVS but not stored in the PE's or DMSs' memories. To minimize the risk associated with the compromise of any given device, the VA preferably employs a different algorithm and/or parameters for each CRP pair, or at least for each CRP-based LVS element, and the corresponding collection of algorithm and parameter information for each LVS element bound to parts in a given device (or in the embodiment of FIG. 13, bound to a given part) is contained in each special element. Each special element preferably may be encrypted with a specific key derived from (e.g., with a hash) a specific individual key known only to the VA and the particular respective device (or part) in which it is embedded or otherwise provided at the time of manufacture. The system in that case also could be configured to allow re-keying of specific keys via communication from the VA to pertinent devices through the PE/DMS without exposing specific key-related information to the PE's and DMS's that can be used by them—for example by the VA transmitting a challenge value (preferably one not included in any LVS) and causing each device (or part) receiving it to transform (e.g., hash) its ensuing response using its individual key, and thenceforth employ the resulting value as its new specific key.

In an embodiment utilizing metadata, a CVS element can consist of $\{C,R, \text{Metadata}\}$, where R is the response of the PUF on challenge C. An LVS element can then be derived from a CVS element as $\{C,H(R\|\text{Metadata})\}$ where $\|$ denotes concatenation and $H(\cap)$ is a cryptographic hash function. Other one-way operations than hashing may instead or additionally be employed on part or all of such derivation to combine the response and metadata, and other reversible or one-way operations (or combinations thereof) than concatenation may be employed such as addition, subtraction, multiplication, division, logarithm, exponent, XOR, all-or-nothing transformation, etc. Infinite permutations of hashing, nested or iterative hashing, or otherwise one-way transforming to combine PUF response and metadata, employing one or more other operations and/or challenge bases or other values or keys, can be devised. The transformation may also be adapted to an interactive or non-interactive zero knowledge proof (such as those described in Applicant's co-pending U.S. patent application Ser. No. 14/704,963, incorporated by reference here), in which case the challenge basis (instead of just the response) may be operated on by a one-way function.

A virtually unlimited number of replacement LVS values corresponding to a given challenge and bound to metadata can be generated, for example, by adding (or using other suitable operation) a constant in the value to be hashed. Numerous replacement LVS sets may be generated for example using a key derivation function, for example with the VA choosing a large (e.g., 128-bit) random salt value SALT and a suitably large iteration count ITER, and calculating $\text{LVS}=\{C,H(R\|\text{Metadata}\|C\|\text{SALT}),\text{SALT},\text{ITER}\}$ for each C in the CVS. Similarly, a virtually unlimited number of metadata-bound LVS elements may be derived from a single CVS element by choosing a new random SALT value. Due to the avalanche property of a one-way function such as a hash function, the types of Metadata should be limited to values that can be ascertained at the time of device enrollment as a single value or a set comprising a manageably small number of possible values (e.g., a roughly discretized sensor readout range).

Other exemplary means of transformation that may be used include discrete logarithm and elliptic curve cryptography. For example, with an elliptic curve E defined over $F_p$, and a public base point G of order q, the VA may enroll a managed device by issuing challenge C and base point G to the device, and storing the device's ensuing response R. The VA calculates $X'=H(R\|C)$, and the PE is provisioned with the tuple $\{C,X'\}$. At authentication, the PE issues the C and G to the managed device, which then performs $R=\text{PUF}(C)$ (wherein a fuzzy extractor may be employed to ensure a reliably constant R, necessitating the storage and/or delivery of a helper value), calculates $X=H(R\|C)$, and calculates and returns the point $X*G$ to the PE. The PE retrieves the tuple {C,X'} from its LVS, calculates X'*G, and verifies the device as authentic if X*G=X'*G. In another embodiment, the PE may be provisioned by the VA with an LVS comprising tuples {C,R} each containing a challenge and obfuscated-response value R (e.g., the output of a hash function evaluated on the PUF response R' and a random salt value S) and employ a nonce (e.g., a 128-bit public value N that is randomly generated by the PE prior to each authentication) to ensure unique authentications, sending a tuple {C,G,N} to the managed device. The managed device calculates R as above, but calculates X=H(R||C||N) and returns X*G to the PE. The PE then calculates X'=H(R||C||N) and subsequently X'*G, and verifies the device as authentic if X*G=X'*G.

In another embodiment, encryption (e.g., a symmetric encryption algorithm such as AES) may also be used. For example, upon authentication, the PE (which has been provisioned by the VA with an LVS comprising tuples {C,R} each containing a challenge and obfuscated-response value R (e.g., the output of a hash function evaluated on the PUF response R' and a random salt value S)) may generate a nonce value N and issue the tuple {C,N} to the managed device. The managed device then calculates R=PUF(C) (potentially employing a fuzzy extractor) and returns X=E(N,H(R||M)) to the PE, where E(Z,K) denotes the encryption of Z using key K. The PE then decrypts X using H(R||M) as the key to recover N, verifying the device as authentic if the recovered value equals the stored value N.

In an embodiment utilizing a biometric authentication sensor, for example a fingerprint scanner in a module (e.g., U.are.U 4500®) or limited to a sensor (e.g., TCS4K swipe sensor), a PUF circuit (e.g., a ring oscillator, SRAM, arbiter, etc.) may optionally be directly integrated with the sensor hardware such that modification to the sensor hardware alters the PUF mapping. As noted, the avalanche property of hash functions requires metadata value that are ascertainable (at least within a manageably small range of possible values) at the time of enrollment, however, and the output of biometric and other kinds of sensors can be noisy; therefore fuzzy extraction (such as taught in "Fuzzy extractors: How to generate strong keys from biometrics and other noisy data," SIAM J. Comput., vol. 38, no. 1, pp. 97-139 (2008) and Juels et al., "A fuzzy commitment scheme," Proceedings of the 6th ACM conference on Computer and communications security, ser. CCS '99, pp. 28-36 (ACM 1999)) or other suitable means may need to be employed to ensure the reliable return of a constant value.

Figure 14:
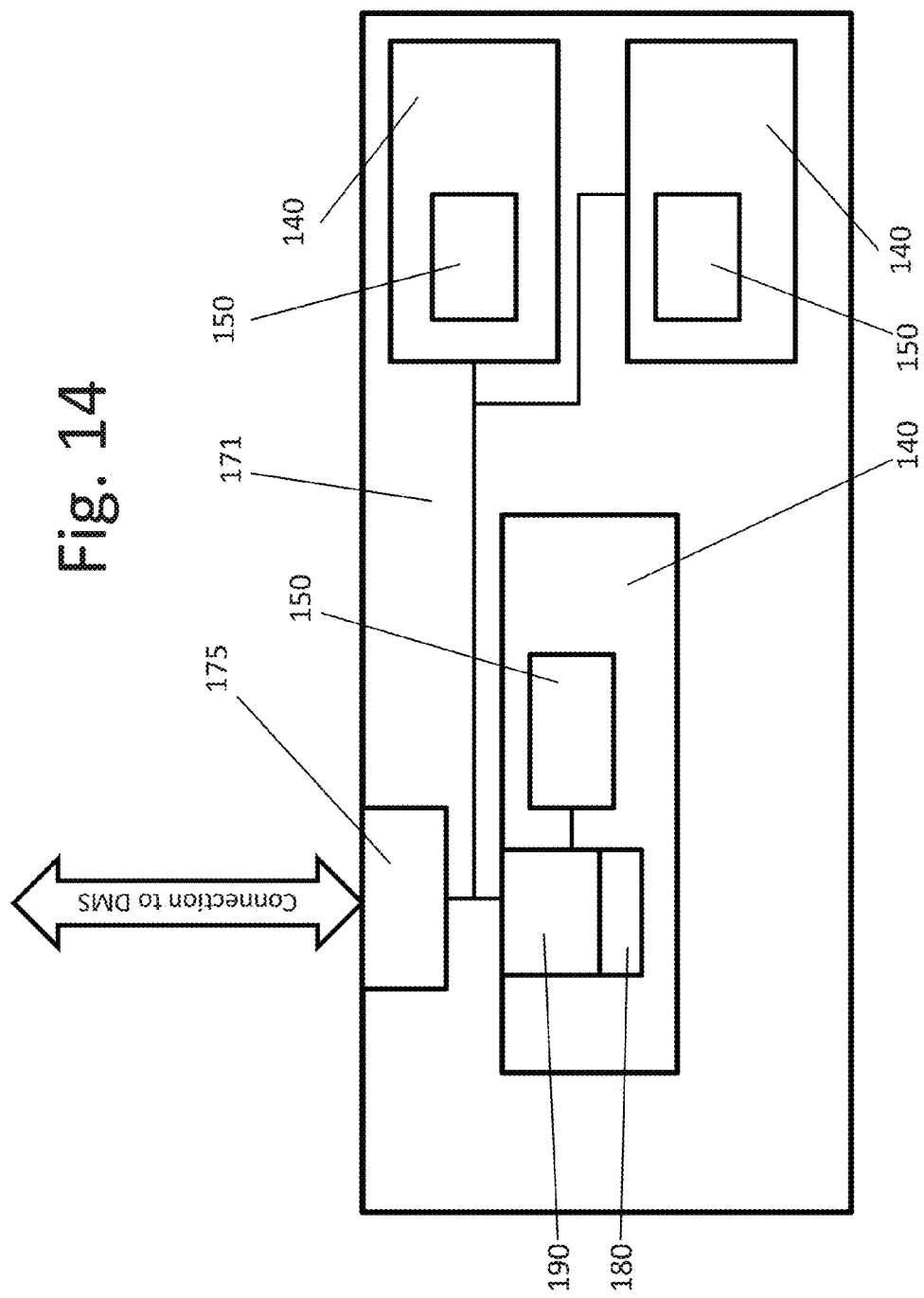
FIG. 14 is a partial circuit diagram of another version of a device having multiple hardware parts with PUFs.
Figure 15:
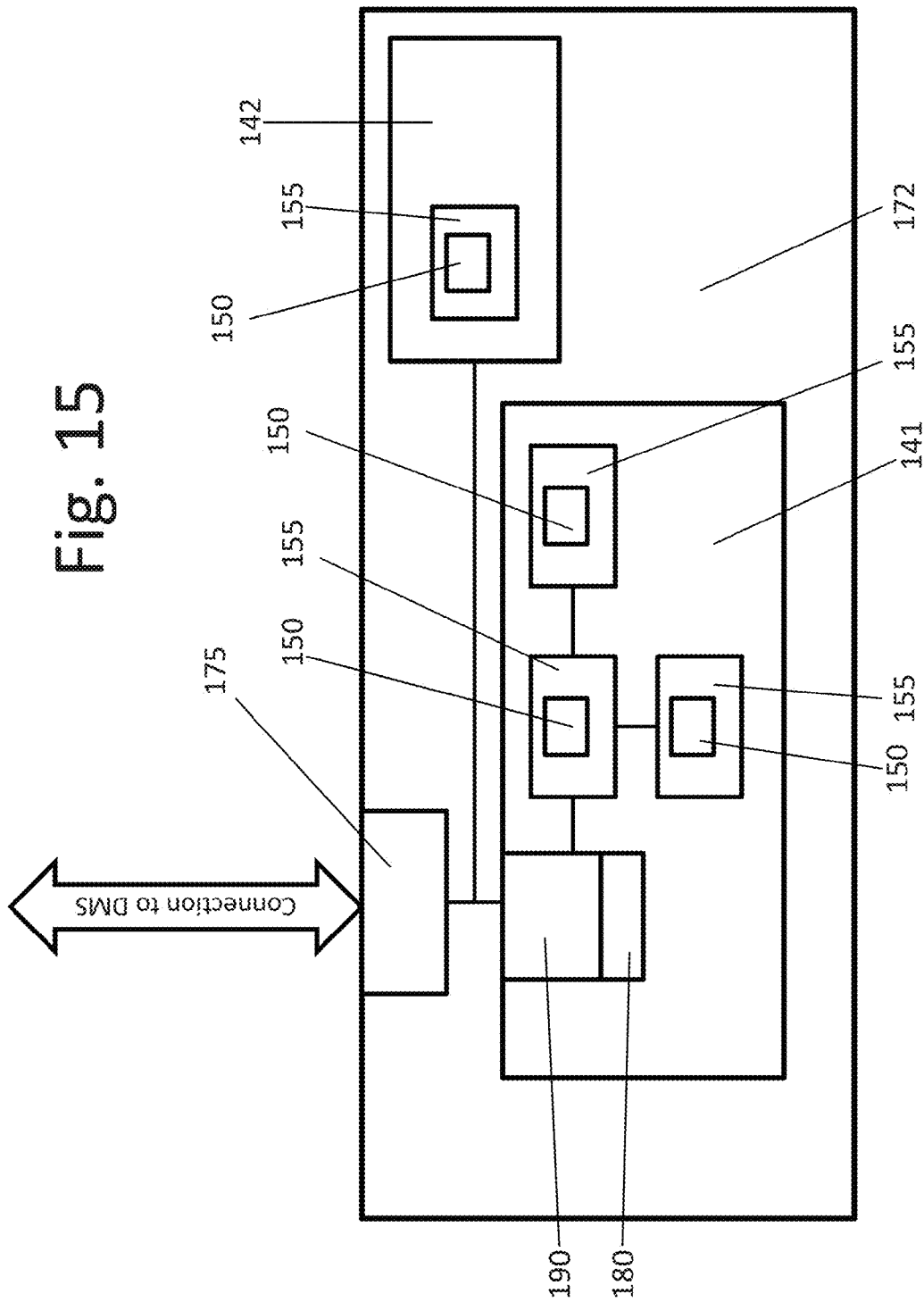
FIG. 15 is a partial circuit diagram of a device that includes a chip having multiple PUFs.
Figure 16:
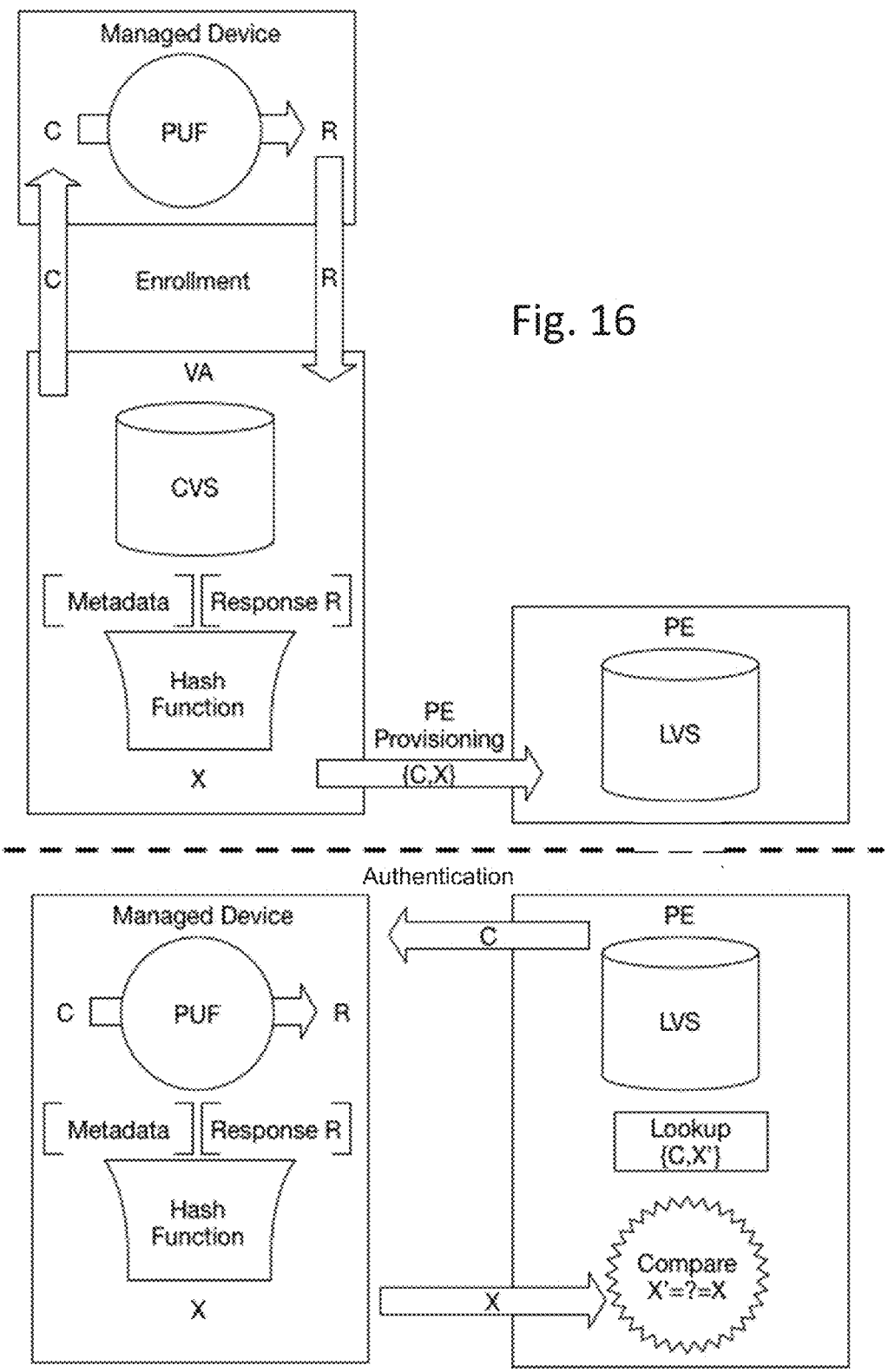
FIG. 16 is a system diagram showing an example embodiment of cryptographic binding of metadata to identifying hardware-specific data.

FIG. 14 shows a device 171 that can be used in an embodiment of an RDA system, which has with multiple hardware parts 140 each having a PUF 150. Authentication in such a device 171 can be managed between hardware parts 140, so that multiple parts are authenticated by the system and/or hardware parts 140 in the device 171 can perform authentication on each other prior to conducting further communication between themselves. Similarly, FIG. 15 shows a device 172 having hardware parts 141 and 142 that each have one or more chips 155 each including a PUF 150. Hardware part 141 has multiple such chips 155, thus permitting chip-to-chip authentication within that hardware part. Moreover, PUF 150 can be placed in a specific circuit within a chip, such as a circuit that is particularly critical or sensitive. The system is preferably configured such that any failure of authentication of a part, chip, or circuit in the devices of FIG. 14 or 15 temporarily shuts down or permanently disables part or all of the device containing it and alerts the system to the failure. In any embodiment of an RDA system utilizing PUFs, one or more PUFs 150 may be adapted to fail authentication upon physical or logical tampering, excessive aging, circuit failure, or other undesired conditions, and may also be adapted to provide some indication of the specific nature of a failed authentication.

Embodiment Utilizing Hardware Security Modules

Rather than using a one-way algorithmic transformation to protect CVS data from exposure at the PE and DMS levels, an embodiment of an RDA system otherwise as described above could be configured to provide CVS subset data to PEs (and PEs subsets thereof to DMSs) without one-way transformation, but governed by hardware security modules ("HSMs") incorporated into each PE and DMS (and possibly VAs, depending on the architecture). In a PUF-based embodiment utilizing device characterization models for example, the HSMs (e.g., Thales e-Security Inc.'s model nC3023E-500 (nShield F2 PCI Express)) could permit only a selected portion or portions of a given device's characterization model to be useable by PEs and DMSs in which the model is stored. HSMs also could be used as an additional measure to protect one-way transformed LVS and ALVS data.

One skilled in the art will appreciate that other variations, modifications, and applications are also within the scope of the present invention. Thus, the foregoing detailed description is not intended to limit the invention in any way, which is limited only by the following claims and their legal equivalents.

What is claimed is:

1. A resilient device authentication system for use with a device including a physical unclonable function ("PUF"), the system comprising:
   a verification authority ("VA"); and
   a provisioning entity ("PE");
   wherein the VA includes:
      a VA processor; and
      a VA memory;
      wherein the VA processor is configured to:
         store, in the VA memory, a complete verification set ("CVS"), the CVS including hardware part-specific data associated with physical properties of the PUF, and metadata associated with the device;
         generate a limited verification set ("LVS") for repeated verification of the device, the generating comprising:
            generating a binding value by combining the hardware part-specific data with the metadata;
            performing a one-way transformation of the binding value; and
            including a result of the one-way transformation in the LVS; and
   the PE includes:
      a PE processor; and
      a PE memory;
      wherein the PE processor is configured to:
         store the generated LVS in the PE memory; and
         generate an application limited verification set ("ALVS"), the generating comprising:
            selecting a subset of the LVS stored in the PE memory; and
            storing the selected subset of the LVS as the ALVS.

2. The system of claim 1, wherein the VA processor is configured to employ a cryptographic hash function to perform the one-way transformation of the binding value.

3. The system of claim 1, wherein generating the binding value comprises concatenating a PUF response with the metadata.

4. The system of claim 1, wherein the VA processor is configured to perform a one-way transformation that employs an iteration count.

5. The system of claim 1, wherein the VA processor is configured to employ an elliptic curve function to perform the one-way transformation of the binding value.

6. The system of claim 1, wherein the VA processor is configured to encrypt the LVS.

7. The system of claim 1, further comprising a device management systems ("DMS") connected to the PE and the device, the DMS including:
   a DMS memory; and
   a DMS processor configured to;
      receive the ALVS from the PE; and
      store the ALVS in the DMS memory.

8. The system of claim 1, wherein the VA processor is further configured to generate a replacement LVS.

9. The system of claim 1, wherein the VA processor is configured to perform a one-way transformation that is adapted to a zero knowledge proof authentication protocol.

10. A computer-implemented method for authenticating a device, the method comprising:
   storing, by a verification authority ("VA"), a complete verification set ("CVS"), the CVS including hardware part-specific data associated with physical properties of a physical unclonable function ("PUF") of the device, and metadata associated with the device;
   generating, by the VA, a limited verification set ("LVS") for repeated verification of the device, the generating comprising:
      generating a binding value by combining the hardware part-specific data with the metadata;
      performing a one-way transformation of the binding value; and
      including a result of the one-way transformation in the LVS;
   storing, by a provisioning entity ("PE"), the generated LVS in a memory of the PE; and
   generating, by the PE, an application limited verification set ("ALVS"), the generating comprising:
      selecting a subset of the LVS stored in the memory of the PE; and
      storing the selected subset of the LVS as the ALVS.

11. The method of claim 10, further comprising employing, by the VA, a cryptographic hash function to perform the one-way transformation of the binding value.

12. The method of claim 10, wherein generating the binding value comprises concatenating a PUF response with the metadata.

13. The method of claim 10, further comprising performing, by the VA, a one-way transformation that employs an iteration count.

14. The method of claim 10, further comprising encrypting, by the VA, the generated LVS.

15. The method of claim 10, further comprising:
   receiving, by a device management system ("DMS"), the ALVS from the PE; and
   storing the ALVS in a memory of the DMS.

16. The method of claim 10, further comprising generating, by the VA, a replacement LVS.

17. At least one non-transitory storage medium storing processor executable instructions that, when executed, perform a method comprising:
   storing a complete verification set ("CVS"), the CVS including hardware part-specific data associated with physical properties of a physical unclonable function ("PUF") of a device, and metadata associated with the device;
   generating a limited verification set ("LVS") for repeated verification of the device, the generating comprising:
      generating a binding value by combining the hardware part-specific data with the metadata;
      performing a one-way transformation of the binding value; and
      including a result of the one-way transformation in the LVS;
   storing the generated LVS; and
   generating an application limited verification set ("ALVS"), the generating comprising:
      selecting a subset of the stored LVS; and
      storing the selected subset of the LVS as the ALVS.

18. The method of claim 17, further comprising employing a cryptographic hash function to perform the one-way transformation of the binding value.

19. The method of claim 17, wherein generating the binding value comprises concatenating a PUF response with the metadata.

20. The method of claim 17, further comprising encrypting the generated LVS.

* * * * *